(12) United States Patent
Ohtake et al.

(10) Patent No.: US 12,337,300 B2
(45) Date of Patent: Jun. 24, 2025

(54) MIXED OXIDE WITH HIGH PORE VOLUME

(71) Applicant: RHODIA OPERATIONS, Aubervilliers (FR)

(72) Inventors: Naotaka Ohtake, Tokushima Prefecture (JP); Toshihiro Sasaki, Tokushima Prefecture (JP)

(73) Assignee: RHODIA OPERATIONS, Aubervilliers (FR)

( * ) Notice: Subject to any disclaimer, the term of this patent is extended or adjusted under 35 U.S.C. 154(b) by 672 days.

(21) Appl. No.: 17/432,176

(22) PCT Filed: Feb. 28, 2020

(86) PCT No.: PCT/EP2020/055320
§ 371 (c)(1),
(2) Date: Aug. 19, 2021

(87) PCT Pub. No.: WO2020/178185
PCT Pub. Date: Sep. 10, 2020

(65) Prior Publication Data
US 2022/0184584 A1   Jun. 16, 2022

(30) Foreign Application Priority Data

Mar. 3, 2019  (EP) ..................................... 19305245
Mar. 3, 2019  (EP) ..................................... 19305246

(51) Int. Cl.
| | | |
|---|---|---|
| *B01J 23/63* | (2006.01) | |
| *B01J 23/00* | (2006.01) | |
| *B01J 35/61* | (2024.01) | |
| *B01J 35/63* | (2024.01) | |
| *B01J 35/64* | (2024.01) | |
| *B01J 37/00* | (2006.01) | |

(Continued)

(52) U.S. Cl.
CPC ............. *B01J 23/63* (2013.01); *B01J 23/002* (2013.01); *B01J 35/613* (2024.01); *B01J 35/615* (2024.01); *B01J 35/633* (2024.01); *B01J 35/635* (2024.01); *B01J 35/651* (2024.01); *B01J 37/009* (2013.01); *B01J 37/038* (2013.01); *B01J 37/04* (2013.01); *B01J 37/082* (2013.01); *C01G 25/006* (2013.01); *C01P 2006/12* (2013.01); *C01P 2006/14* (2013.01); *C01P 2006/16* (2013.01)

(58) Field of Classification Search
CPC ...... B01J 35/651; B01J 35/613; B01J 23/002; C01G 25/006
See application file for complete search history.

(56) References Cited

U.S. PATENT DOCUMENTS

| | | |
|---|---|---|
| 2006/0178261 A1 | 8/2006 | Larcher et al. |
| 2009/0220398 A1 | 9/2009 | Verdier et al. |

(Continued)

FOREIGN PATENT DOCUMENTS

| | | | | |
|---|---|---|---|---|
| EP | 0955267 A1 | 11/1999 | | |
| WO | WO2017187085 | * 11/2017 | ............. | B01D 53/94 |

*Primary Examiner* — Anthony J Zimmer
*Assistant Examiner* — Eric Scott Sherman
(74) *Attorney, Agent, or Firm* — Osha Bergman Watanabe & Burton LLP (57) ABSTRACT

The present invention relates to a mixed oxide composition based on zirconium and cerium, to the process for preparing it and to its use in the field of catalysis. The mixed oxide is characterized by a high specific surface area and a specific porosity after calcination at 1100° C.

24 Claims, 1 Drawing Sheet

(51) Int. Cl.
- *B01J 37/03* (2006.01)
- *B01J 37/04* (2006.01)
- *B01J 37/08* (2006.01)
- *C01G 25/00* (2006.01)

(56) References Cited

U.S. PATENT DOCUMENTS

| | | | |
|---|---|---|---|
| 2013/0142713 A1* | 6/2013 | Ifrah | C01G 25/00 |
| | | | 423/213.2 |
| 2013/0288891 A1 | 10/2013 | Matsuo et al. | |
| 2017/0182481 A1* | 6/2017 | Fujimoto | B01J 23/83 |

* cited by examiner

MIXED OXIDE WITH HIGH PORE VOLUME

The present application is a U.S. national phase entry under 35 U.S.C. § 371 of International Application No. PCT/EP2020/055320, filed on Feb. 28, 2020, which claims the priority of European patent application EP 19305245.3 filed on Mar. 3, 2019, and of European patent application EP19305246.1 filed on Mar. 3, 2019. The entire contents of these applications are explicitly incorporated herein by this reference. In case of any incoherency between the present application and the EP applications that would affect the clarity of a term or expression, it should be made reference to the present application only.

The present invention relates to a mixed oxide composition based on zirconium and cerium, to the process for preparing it and to its use in the field of catalysis.

FIELD OF THE INVENTION

"Multifunctional" catalysts are currently used for treating exhaust gases from internal combustion engines (motor vehicle post-combustion catalysis). The term "multifunctional" is understood to mean catalysts capable of carrying out not only oxidation, in particular of carbon monoxide and of hydrocarbons present in the exhaust gases, but also reduction, in particular of nitrogen oxides also present in these gases ("three-way" catalysts). The compositions based on oxides of zirconium and of rare earths today appear to be advantageous elements that can be incorporated into the composition of catalysts of this type.

The products of this type must exhibit a compromise between a porosity which is suitable for the use and a resistance to temperature. In particular, they must exhibit a sufficiently high pore volume, and thus comprise pores of sufficiently large size, to allow good diffusion of the gases from and to the catalytic sites. Proper diffusion of the gases also allows to maintain the air/fuel ratio at the optimum for the oxygen absorbing and desorbing capability, which favors optimal performance of the mixed oxide.

The porosity should also be such that the mixed oxide is easily mixed with the other components of the washcoat and such that the platinum group metal(s) (PGM) is/are well impregnated and/or well dispersed in the washcoat. The mixed oxide of the invention which is disclosed below aims at addressing these technical problems.

TECHNICAL BACKGROUND

In WO 2017/185224, the mixed oxide exhibit a total pore volume comprised between 0.2 and 0.5 mL/g, after calcination at 1000° C. for 4 hours under air.

WO 2011/006780 does not disclose a specific surface area (BET) of at least 28 m$^2$/g after calcination in air at 1100° C. for 4 hours.

EP 2566617 discloses a mixed oxide that exhibits a population of pores of which the diameter is centered about a value of between 30 nm and 70 nm.

U.S. Pat. No. 7,767,617 B2 (equivalent to US 2006/178261) discloses a process in which a dispersion of a precipitate is subjected to a moderate-energy milling operation, for example using a colloid mill or a turbine agitator. Yet, the precipitate is obtained by contact with a basic solution and not by thermohydrolysis. Moreover, in U.S. Pat. No. 7,767,617 B2, there is no mention of particles of zirconium oxyhydroxide with a d50 between 5.0 µm and 100 µm.

U.S. Pat. No. 8,158,551 (equivalent to US 2009/220398) discloses a process in which there is no mention of particles of zirconium oxyhydroxide with a d50 between 5.0 µm and 100 µm.

US 2013/288891 and EP 0955267 disclose composite oxides but without mention of the characteristics of the mixed oxide of the invention.

FIGURES

FIG. 2 represents the program of the mixed oxide of example 7. The peak with the highest intensity in the domain of the pores with a size lower than 500 nm is visible at and corresponds to $D_{p,1100° C./4 h}$=363 nm.

The calcinations, more particularly the calcinations after which the values of specific surface area or of porosity are given, are calcinations in air, unless otherwise mentioned. It is also specified, for the continuation of the description, that, unless otherwise indicated, in the ranges of values which are given, the values at the limits are included. This applies also to the expressions comprising "at least" or "at most".

BRIEF DESCRIPTION OF THE INVENTION

The invention first relates to a mixed oxide as defined in the claims below. It thus relates to a mixed oxide of zirconium, of cerium, of lanthanum and optionally of at least one rare-earth element other than cerium and other than lanthanum (RE) with the following composition:
- between 18.0% and 70.0% by weight of cerium;
- between 1.0% and 10.0% by weight of lanthanum;
- up to 10.0% by weight of the rare earth element(s) (RE(s)) other than cerium and other than lanthanum;
- the remainder as zirconium;

the mixed oxide being in the form of particles exhibiting a d50 strictly higher than 2.5 µm and the proportions of the elements (Ce, La, RE, Zr) being given by weight of oxide relative to the mixed oxide as a whole, characterized in that:
- it exhibits a specific surface area (BET) of at least 28 m$^2$/g, more particularly at least 30 m$^2$/g, even more particularly at least 31 m$^2$/g, after calcination in air at 1100° C. for 4 hours;
- the peak with the highest intensity in the domain of the pores with a size lower than 500 nm corresponds to a pore size $D_{p,1100° C./4 h}$ between 70 nm, this value being excluded, and 500 nm, more particularly between 100 and 500 nm, even more particularly between 100 and 400 nm or between 100 and 370 nm or between 120 and 370 nm;
- it exhibits a total pore volume $V_{500 nm, 1100° C./4 h}$ for the pores with a size lower than 500 nm, of at least 0.30 mL/g, more particularly of at least 0.40 mL/g, even more particularly of at least 0.50 mL/g, even more particularly of at least 0.60 mL/g;

the pore size $D_{p,1100° C./4 h}$ and the total pore volume $V_{500 nm, 1100° C./4 h}$ being determined by mercury porosimetry on the mixed oxide after calcination in air at 1100° C. for 4 hours.

The invention also relates to a mixed oxide consisting of a combination of the oxides of zirconium, of cerium, of lanthanum, optionally of at least one rare earth element other than cerium and other than lanthanum and optionally of hafnium, with the following composition:
- between 18.0% and 70.0% by weight of cerium;
- between 1.0% and 10.0% by weight of lanthanum;

up to 10.0% by weight of the rare earth element(s) (RE(s)) other than cerium and other than lanthanum;
a proportion of hafnium lower or equal to 2.5%, even lower or equal to 2.0%;
the remainder as zirconium;
the mixed oxide being in the form of particles exhibiting a d50 strictly higher than 2.5 μm and the proportions of the elements (Ce, La, RE, Hf, Zr) being given by weight of oxide relative to the mixed oxide as a whole, characterized in that:
   it exhibits a specific surface area (BET) of at least 28 m²/g, more particularly at least 30 m²/g, even more particularly at least 31 m²/g, after calcination in air at 1100° C. for 4 hours;
   the peak with the highest intensity in the domain of the pores with a size lower than 500 nm corresponds to a pore size $D_{p,1100°\ C./4\ h}$ between 70 nm, this value being excluded, and 500 nm, more particularly between 100 and 500 nm, even more particularly between 100 and 400 nm or between 100 and 370 nm or between 120 and 370 nm;
   it exhibits a total pore volume $V_{500\ nm,\ 1100°\ C./4\ h}$ for the pores with a size lower than 500 nm, of at least 0.30 mL/g, more particularly of at least 0.40 mL/g, even more particularly of at least 0.50 mL/g, even more particularly of at least 0.60 mL/g;
   the pore size $D_{p,1100°\ C./4\ h}$ and the total pore volume $V_{500\ nm,\ 1100°\ C./4\ h}$ being determined by mercury porosimetry on the mixed oxide after calcination in air at 1100° C. for 4 hours.

The invention also relates to a process of preparation of a mixed oxide, notably the mixed oxide of the invention, as defined in the claims below.

The process comprises the following steps:
(a) an aqueous acidic dispersion S is heated at a temperature between 100° C. and 180° C. in order to obtain a dispersion comprising a liquid medium and a precipitate, wherein the dispersion S comprises:
   (i) cerium nitrate with a $Ce^{IV}/Ce^{IV}+Ce^{III}$ molar ratio of at least 90.0 mol %;
   (ii) lanthanum nitrate;
   (iii) optionally at least one nitrate of a rare earth element (RE) other than cerium and other than lanthanum; and
   (iv) particles of zirconium oxyhydroxide wherein the powder of zirconium oxyhydroxide used for the preparation of the dispersion exhibits an average size d50 between 5.0 μm and 100.0 μm, more particularly between 5.0 μm and 50.0 μm, even more particularly between 25.0 μm and 40.0 μm, d50 corresponding to the median value of a distribution of size of the particles (in volume) obtained with a laser diffraction particle size analyzer;
the dispersion S being characterized by a molar ratio $H^+/Zr$ between 1.0 and 3.5, more particularly between 1.5 and 3.0;
(b) an ammonia solution is added to the mixture obtained at the end of step (a) until the pH of the mixture is at least 8.0;
(c) an organic texturing agent is then added to the mixture obtained at the end of step (b), the mixture being stirred with a high shear-rate mixer;
(d) the solid material obtained at the end of step (c) is separated off from the liquid medium and calcined in air.

The invention also relates to a catalytic composition comprising:
   (i) at least one mineral material; and
   (ii) at least one dispersed platinum group metal; and
   (iii) the mixed oxide of the invention.

The invention also relates to the use of the mixed oxide of the invention for the preparation of a catalytic composition or a catalytic converter.

More details about these inventions are given below.

DESCRIPTION

The present invention relates to a mixed oxide of zirconium, of cerium, of lanthanum and optionally of at least one rare-earth element other than cerium and other than lanthanum (RE) with the following composition:
   between 18.0% and 70.0% by weight of cerium;
   between 1.0% and 10.0% by weight of lanthanum;
   up to 10.0% by weight of the rare earth element(s) (RE(s)) other than cerium and other than lanthanum;
   the remainder as zirconium;
the mixed oxide being in the form of particles exhibiting a d50 strictly higher than 2.5 μm, characterized in that:
   it exhibits a specific surface area (BET) of at least 28 m²/g, more particularly at least 30 m²/g, even more particularly at least 31 m²/g, after calcination in air at 1100° C. for 4 hours;
   the peak with the highest intensity in the domain of the pores with a size lower than 500 nm corresponds to a pore size $D_{p,1100°\ C./4\ h}$ between 70 nm, this value being excluded, and 500 nm, more particularly between 100 and 500 nm, even more particularly between 100 and 400 nm or between 100 and 370 nm or between 120 and 370 nm;
   it exhibits a total pore volume $V_{500\ nm,\ 1100°\ C./4\ h}$ for the pores with a size lower than 500 nm, of at least 0.30 mL/g, more particularly of at least 0.40 mL/g, even more particularly of at least 0.50 mL/g, even more particularly of at least 0.60 mL/g;
   the pore size $D_{p,1100°\ C./4\ h}$ and the total pore volume $V_{500\ nm,\ 1100°\ C./4\ h}$ being determined by mercury porosimetry on the mixed oxide after calcination in air at 1100° C. for 4 hours.

The mixed oxide of the invention may also comprise the element hafnium. Indeed, this element is usually present in combination with zirconium in the ores which are present in the natural state. The relative proportion of hafnium with respect to zirconium depends on the ore from which zirconium is extracted. The relative proportion by weight Zr/Hf in some ores may be around 50/1. Thus baddeleyite contains roughly 98% of $ZrO_2$ and 2% of $HfO_2$. The proportion of hafnium is lower or equal to 2.5%, even lower or equal to 2.0%.

The above mentioned elements are generally present in the mixed oxide as oxides. They may nonetheless be also partially present in the form of hydroxides or oxyhydroxides. As for zirconium, hafnium is generally present as an oxide. It is not excluded though that hafnium is also present partly in the form of an hydroxide or oxyhydroxide. Thus, the elements Ce, Zr, La, RE, if any, and Hf, if any, are present in the mixed oxide as oxides but they may also be present in the mixed oxide as oxides and also partially in the form of hydroxides or oxyhydroxides.

As usual in the field of mixed oxides, the proportions of the elements are given by weight of oxide relative to the mixed oxide as a whole. For the calculations of these proportions, the following oxides are considered: $CeO_2$, $ZrO_2$, $HfO_2$, $La_2O_3$, $RE_2O_3$ for all REs except for Pr for which $Pr_6O_{11}$ is considered. Thus, as an example, a proportion of 20.0% of cerium means a proportion by weight of 20.0% of $CeO_2$ in the mixed oxide. The proportions of the elements are determined by the usual analytical methods like X-ray fluorescence or by Inductively Coupled Plasma Mass Spectrometry. It is also pointed out that, unless otherwise mentioned, in the ranges of values that are given, the limit values are included.

The mixed oxide of the invention comprises the above mentioned elements with the above mentioned proportions but it may also additionally comprise other elements like impurities. The impurities may stem from the raw materials or starting materials used in the process of preparation of the mixed oxide. The total proportion of the impurities may generally be less than or equal to 0.25% by weight (≤0.25%), more particularly less than or equal to 0.20% by weight (≤0.20%), with respect to the mixed oxide.

The mixed oxide according to the invention is characterized first of all by the nature and proportions of its components. The proportion of cerium in the mixed oxide may vary in a broad range. Indeed, the proportion of cerium is between 18.0% and 70.0%, more particularly between 18.0% and 65.0% (this value being excluded) or more particularly between 25.0% and 70.0% or between 25.0% and 65.0% (this value being excluded). The proportion of cerium may also be more particularly:

between 18.0% and 25.0%, more particularly between 18.0% and 22.0%; or
between 35.0% and 45.0%, more particularly between 38.0% and 42.0%; or
between 45.0% and 55.0%, more particularly between 48.0% and 52.0%; or
between 60.0% and 70.0%, more particularly between 63.0% and 67.0%.

The proportion of lanthanum in the mixed oxide is between 1.0% and 10.0%, more particularly between 3.0% and 10.0%. This proportion may be between 3.0% and 7.0%.

The mixed oxide may also comprise at least one rare-earth element other than cerium and other than lanthanum (RE). The rare-earth element may be selected in the group consisting of yttrium and of the elements of the periodic table with atomic numbers between 57 and 71 inclusive. More particularly, the rare-earth element(s) may be selected in the group consisting of Nd, Y and Pr. Y and Pr are more particularly preferred. The mixed oxide may comprise one or two rare-earth element(s) other than cerium and other than lanthanum. The total proportion of the rare-earth element(s) other than cerium and other than lanthanum is up to 10.0%, more particularly up to 7.0%.

According to an embodiment, if the mixed oxide does not comprise any rare-earth element other than cerium and other than lanthanum, the proportion of lanthanum is at least 5.0%. According to another embodiment, if the mixed oxide comprises at least one rare-earth element other than cerium and other than lanthanum, the total proportion of lanthanum and the rare-earth element(s) other than cerium and other than lanthanum in the mixed oxide is at least 5.0%. According to another embodiment, if the mixed oxide comprises at least one rare-earth element other than cerium and other than lanthanum, the total proportion of lanthanum and the rare-earth element(s) other than cerium and other than lanthanum in the mixed oxide is at most 15.0%, more particularly at most 12.0%.

Zirconium oxide is the remainder of the composition. The proportion by weight of zirconium is as remainder to 100% of the other elements (Ce, La, RE, Hf) of the mixed oxide. The proportion of zirconium in the mixed oxide is at least 10.0%, more particularly at least 20.0%, more particularly at least 25.0%, this value being excluded. This proportion may be at most 81.0%, more particularly at most 79.0%, more particularly at most 60.0%.

The mixed oxide of the invention is also characterized by a high specific surface area. The specific surface area (BET) of the mixed oxide after calcination in air at 1100° C. for 4 hours is at least 28 $m^2/g$, more particularly at least 30 $m^2/g$, even more particularly at least 31 $m^2/g$. This specific surface area (BET) is usually at most 40 $m^2/g$, more particularly up to 35 $m^2/g$. This specific surface area (BET) may be between 28 and 40 $m^2/g$, more particularly between 28 and 35 $m^2/g$, more particularly between 30 and 35 $m^2/g$.

After calcination in air at 1000° C. for 4 hours, the mixed oxide may also exhibit a specific surface area (BET) which is at least 50 $m^2/g$, more particularly at least 55 $m^2/g$. This specific surface area (BET) may be between 50 and 70 $m^2/g$, more particularly between 55 and 60 $m^2/g$.

After calcination in air at 900° C. for 4 hours, the mixed oxide may also exhibit a specific surface area (BET) which is at least 60 $m^2/g$, more particularly at least 65 $m^2/g$. This specific surface area (BET) may be between 60 and 90 $m^2/g$, more particularly between 65 and 80 $m^2/g$.

The term "specific surface area (BET)" is understood to mean the BET specific surface area determined by nitrogen adsorption. The specific surface area is well-known to the skilled person and is measured according to the Brunauer-Emmett-Teller method. The theory of the method was originally described in the periodical "The Journal of the American Chemical Society, 60, 309 (1938)". More detailed information about the theory may also be found in chapter 4 of "Powder surface area and porosity", $2^{nd}$ edition, ISBN 978-94-015-7955-1. The method of nitrogen adsorption is disclosed in standard ASTM D 3663-03 (reapproved 2008).

In practice, the specific surface areas (BET) may be determined automatically with the appliance Flowsorb II 2300 or the appliance Tristar 3000 of Micromeritics according to the guidelines of the constructor. They may also be determined automatically with a Macsorb analyzer model 1-1220 of Mountech according to the guidelines of the constructor. Prior to the measurement, the samples are degassed by heating at a temperature of at most 300° C. to remove the adsorbed volatile species, optionally under vacuum. More specific conditions may be found in the examples.

The mixed oxide is also characterized by a specific porosity in the domain of the pores 70-500 nm after calcination in air at 1100° C. for 4 hours. Indeed, the mixed oxide is characterized by a high porous volume in this domain. Thus, it is possible to determine on the porosity curve, for the mixed oxide after calcination in air at 1100° C. for 4 hours, the peak with the highest intensity in the domain of the pores with a size lower than 500 nm which corresponds to a pore size $D_{p,1100° C./4 h}$ between 70 nm, this value being excluded, and 500 nm, more particularly between 100 and 500 nm, even more particularly between 100 and 400 nm or between 100 and 370 nm or between 120 and 370 nm.

Moreover, after calcination in air at 1100° C. for 4 hours, the mixed oxide exhibits a total pore volume ($V_{500 nm, 1100° C./4 h}$) for the pores with a size lower than 500 nm, of at least 0.30 mL/g, more particularly of at least 0.40 mL/g, even more particularly of at least 0.50 mL/g, even more particularly of at least 0.60 mL/g. $V_{500 nm, 1100° C./4 h}$ may be between 0.30 and 0.70 mL/g, more particularly between 0.40 and 0.70 mL/g, even more particularly between 0.50 and 0.70 mL/g or between 0.60 and 0.70 mL/g. In addition, the mixed oxide may also be characterized by a ratio α lower than 0.35, more particularly lower than 0.30, α being defined by the following formula:

$$\alpha = V_{70\ nm, 1100°\ C./4\ h} / V_{500\ nm, 1100°\ C./4\ h}$$

wherein $V_{70\ nm,\ 1100°\ C./4\ h}$ is the total pore volume for the pores with a size lower than 70 nm, after calcination in air at 1100° C. for 4 hours.

According to an embodiment, after calcination in air at 1100° C. for 4 hours, the porosity curve of the mixed oxide does not exhibit any peak in the domain of the pores with a size lower than 70 nm.

After calcination in air at 1100° C. for 4 hours, the mixed oxide may exhibit a total pore volume which is at least 0.60 mL/g, more particularly at least 0.90 mL/g, even more particularly at least 1.00 mL/g or least 1.50 mL/g. This total pore volume may be between 0.60 and 1.90 mL/g, more particularly between 0.90 and 1.90 mL/g, even more particularly between 1.00 and 1.90 mL/g or between 1.50 and 1.90 mL/g.

It is also possible to determine similar parameters after calcination in air at 900° C. for 4 hours. Indeed, after calcination in air at 900° C. for 4 hours, the porosity curve of the mixed oxide exhibits in the domain of the pores with a size lower than 500 nm, a peak with the highest intensity for which the maximum corresponds to a pore size $D_{p,\ 900°\ C./4\ h}$ between 35 nm and 75 nm. Moreover, after calcination in air at 900° C. for 4 hours, the mixed oxide exhibits a total pore volume ($V_{500\ nm,\ 900°\ C./4\ h}$) for the pores with a size lower than 500 nm, of at least 0.50 mL/g, more particularly of at least 0.70 mL/g. $V_{500\ nm,\ 900°\ C./4\ h}$ may be between 0.50 and 1.00 mL/g, more particularly between 0.70 and 1.00 mL/g.

The parameters of the porosity (e.g. $D_{p,\ 1100°\ C./4\ h}$, $V_{500\ nm,\ 1100°\ C./4\ h}$, $V_{70\ nm,\ 1100°\ C./4\ h}$, $D_{p,900°\ C./4\ h}$ and $V_{500\ nm,\ 900°\ C./4\ h}$) are determined by mercury porosimetry after the mixed oxide has been calcined in air at 1100° C. for 4 hours or 900° C. for 4 hours. Mercury porosimetry is a well-known technique used in the field of porous catalysts and consists in the progressive intrusion of mercury into the pores of the porous structure under stringently controlled pressures. The porosity is measured by mercury intrusion according to the well-known techniques in the field. The porosimeter comprises a powder penetrometer. The method is based on the determination of the pore volume as a function of the pore size (V=f(d), V denoting the pore volume and d denoting the pore size). From these data, it is possible to calculate the porous volumes and to obtain a curve (C) giving the derivative dV/d log D.

The porosity may be determined in accordance with the standard ASTM D 4284-83 ("Standard method for determining pore volume distribution of catalysts by mercury intrusion porosimetry"). The porosity may be determined by the method disclosed in the examples. Porosity may be determined with the use of appliance Autopore IV 9500 of Micromeritics.

From curve (C), $D_{p,\ 1100°\ C./4\ h}$ and $D_{p,\ 900°\ C./4\ h}$ can be determined. To make things clear:

$D_{p,\ 1100°\ C./4\ h}$: after the mixed oxide is calcined in air at 1100° C. for 4 hours, the porosity curve of the mixed oxide exhibits in the domain of the pores with a size lower than 500 nm, a peak with the highest intensity for which the maximum corresponds to the pore size $D_{p,\ 1100°\ C./4\ h}$;

$D_{p,\ 900°\ C./4\ h}$: after the mixed oxide is calcined in air at 900° C. for 4 hours, the porosity curve of the mixed oxide exhibits in the domain of the pores with a size lower than 500 nm, a peak with the highest intensity for which the maximum corresponds to the pore size $D_{p,\ 900°\ C./4\ h}$.

The porosity may be determined according to the guidelines of the constructor using a Micromeritics V 9620 Automatic Mercury Porosimeter.

The mixed oxide of the invention is in the form of particles which exhibit a d50 strictly higher than 2.5 μm. d50 (median) has the usual meaning used in statistics. d50 represents the particle size such that 50% of the particles is less than or equal to the said size. d50 is determined from a distribution of size of the particles (in volume) obtained with a laser diffraction particle size analyzer. Generally, the distribution is obtained from a dispersion of the particles in water, optionally in the presence of a dispersant (sodium hexametaphosphate).

For instance, d50 may be determined according to the following method. A laser particle size analyzer Model LS13320 of Beckman-Coulter is used. The Fraunhofer mode may be used following the guidelines of the constructor. The distribution is obtained from a dispersion of the particles in water in the presence of a dispersant (sodium hexametaphosphate). A relative refractive index of 1.6 is used.

Generally, d50 is between 2.5 (value excluded) and 20.0 μm, more particularly between 2.5 (value excluded) and 10.0 μm, even more particularly between 2.5 (value excluded) and 7.0 μm.

A specific mixed oxide according to the invention exhibits the following properties:

- a specific surface area (BET) of at least 30 m²/g after calcination in air at 1100° C. for 4 hours;
- a peak with the highest intensity in the domain of the pores with a size lower than 500 nm corresponding to a pore size $D_{p,1100°\ C./4\ h}$ between 100 and 400 nm or between 100 and 370 nm or between 120 and 370 nm;
- a total pore volume $V_{500\ nm,\ 1100°\ C./4\ h}$ for the pores with a size lower than 500 nm, of at least 0.50 mL/g;
- a total pore volume of at least 1.00 mL/g after calcination in air at 1100° C. for 4 hours.

This specific surface area may also exhibit a ratio α lower than 0.35, more particularly lower than 0.30.

As regards the use of the mixed oxide according to the invention, this comes within the field of motor vehicle pollution control catalysis. The mixed oxide according to the invention may be used in the preparation of a catalytic converter, the role of which is to treat motor vehicle exhaust gases. The catalytic converter comprises at least one catalytically active coating layer prepared from the mixed oxide and deposited on a solid support. The role of the coating layer is to convert, by chemical reactions, certain pollutants of the exhaust gas, in particular carbon monoxide, unburnt hydrocarbons and nitrogen oxides, into products which are less harmful to the environment. The chemical reactions involved may be the following ones:

$$2CO + O_2 \rightarrow 2CO_2$$

$$2NO + 2CO \rightarrow N_2 + 2CO_2$$

$$4C_xH_y + (4x+y) \rightarrow O_2 \rightarrow 4xCO_2 + 2yH_2O$$

The solid support can be a metal monolith, for example Fe—Cr alloy, or be made of ceramic. The ceramic may be cordierite, silicon carbide, alumina titanate or mullite. A commonly used solid support consists of a monolith, generally cylindrical, comprising a multitude of small parallel channels having a porous wall. This type of support is often made of cordierite and exhibits a compromise between a high specific surface and a limited pressure drop.

The coating layer, commonly known as "washcoat", is deposited at the surface of the solid support. The coating layer is formed from a catalytic composition comprising the mixed oxide mixed with at least one mineral material. The mineral material can be selected in the group consisting of alumina, titanium oxide, cerium oxide, zirconium oxide, silica, spinels, zeolites, silicates, crystalline silico-aluminum phosphates and crystalline aluminum phosphates. The composition can also comprise other additives which are specific to each formulator: $H_2S$ scavenger, organic or inorganic modifier having the role of facilitating the coating, colloidal alumina, and the like. The coating layer thus comprises such a composition. Alumina is a commonly employed mineral material, it being possible for this alumina to optionally be doped, for example with an alkaline earth metal, such as barium. The coating layer also comprises at least one dispersed platinum group metal (PGM), which is more particularly selected in the group consisting of Pt, Rh or Pd. The amount of the PGM is generally between 1 and 400 g, with respect to the volume of the monolith, expressed in $ft^3$. The precious metal is catalytically active.

The catalytic composition thus comprises:
(i) at least one mineral material; and
(ii) at least one dispersed platinum group metal; and
(iii) the mixed oxide of the invention.

One method of dispersing the PGM and of preparing the catalyst consists in mixing an aqueous solution of a salt of the PGM and an aqueous dispersion of the mixed oxide or of the mineral material or of the mixture formed of the mixed oxide and of the mineral material; drying the mixture to remove partly or totally the water and to calcine the obtained solid in air. The salt can, for example, be a chloride or a nitrate of the PGM, such as rhodium nitrate. The water is removed from the dispersion, in order to deposit the PGM, the solid is dried and it is calcined under air at a temperature which is generally between 300° C. and 800° C. An example of preparation of a catalyst may be found in example 1 of U.S. Pat. No. 7,374,729.

The coating layer is obtained by the application of the dispersion to the solid support. The coating layer thus exhibits a catalytic activity and can act as pollution-control catalyst. The pollution-control catalyst can be used to treat exhaust gases from internal combustion engines. For this reason, the invention also relates to a process for the treatment of exhaust gases from internal combustion engines which is characterized in that use is made of a catalytic converter comprising a coating layer, which coating layer is as described above.

A particular advantage of the mixed oxide of the invention is that the PGM is well and homogeneously dispersed on the surface of catalyst.

Process of Preparation of the Mixed Oxide of the Invention

The mixed oxide of the invention may be prepared by the following process which comprises the following steps:
(a) an aqueous acidic dispersion S is heated at a temperature between 100° C. and 180° C. in order to obtain a dispersion comprising a liquid medium and a precipitate, wherein the dispersion S comprises:
 (i) cerium nitrate with a $Ce^{IV}/Ce^{IV}\pm Ce^{III}$ molar ratio of at least 90.0 mol %;
 (ii) lanthanum nitrate;
 (iii) optionally at least one nitrate of a rare earth element (RE) other than cerium and other than lanthanum; and
 (iv) particles of zirconium oxyhydroxide wherein the powder of zirconium oxyhydroxide used for the preparation of the dispersion exhibits an average size d50 between 5.0 µm and 100.0 µm, more particularly between 5.0 µm and 50.0 µm, even more particularly between 25.0 µm and 40.0 µm, d50 corresponding to the median value of a distribution of size of the particles (in volume) obtained with a laser diffraction particle size analyzer;
 the dispersion S being characterized by a molar ratio $H^+/Zr$ between 1.0 and 3.5, more particularly between 1.5 and 3.0;
(b) an ammonia solution is added to the mixture obtained at the end of step (a) until the pH of the mixture is at least 8.0;
(c) an organic texturing agent is then added to the mixture obtained at the end of step (b), the mixture being stirred with a high shear-rate mixer;
(d) the solid material obtained at the end of step (c) is separated off from the liquid medium and calcined in air.

In step (a), an aqueous dispersion S comprising (i) cerium nitrate with a $Ce^{IV}/Ce^{IV}+Ce^{III}$ molar ratio of at least 90.0 mol %, (ii) lanthanum nitrate, (iii) optionally at least one salt of a rare earth element (RE) other than cerium and lanthanum and (iv) particles of zirconium oxyhydroxide is heated at a temperature of at least 100° C. in order to obtain a dispersion comprising a liquid medium and a precipitate.

The invention also relates to a process of preparation of a mixed oxide of zirconium, of cerium, of lanthanum and optionally of at least one rare-earth element other than cerium and other than lanthanum (RE) with the following composition:
between 18.0% and 70.0% by weight of cerium;
between 1.0% and 10.0% by weight of lanthanum;
up to 10.0% by weight of the rare earth element(s) (RE(s)) other than cerium and other than lanthanum;
the remainder as zirconium;
the mixed oxide being in the form of particles exhibiting a d50 strictly higher than 2.5 µm and the proportions of the elements (Ce, La, RE, Zr) being given by weight of oxide relative to the mixed oxide as a whole,
comprising the following steps:
(a) an aqueous acidic dispersion S is heated at a temperature between 100° C. and 180° C. in order to obtain a dispersion comprising a liquid medium and a precipitate, wherein the dispersion S comprises:
 (i) cerium nitrate with a $Ce^{IV}/Ce^{IV}\pm Ce^{III}$ molar ratio of at least 90.0 mol %;
 (ii) lanthanum nitrate;
 (iii) optionally at least one nitrate of a rare earth element (RE) other than cerium and other than lanthanum; and
 (iv) particles of zirconium oxyhydroxide wherein the powder of zirconium oxyhydroxide used for the preparation of the dispersion exhibits an average size d50 between 5.0 µm and 100.0 µm, more particularly between 5.0 µm and 50.0 µm, even more particularly between 25.0 µm and 40.0 µm, d50 corresponding to the median value of a distribution of size of the particles (in volume) obtained with a laser diffraction particle size analyzer;
the dispersion being characterized by a molar ratio $H^+/Zr$ between 1.0 and 3.5, more particularly between 1.5 and 3.0;
(b) an ammonia solution is added to the mixture obtained at the end of step (a) until the pH of the mixture is at least 8.0;

(c) an organic texturing agent is then added to the mixture obtained at the end of step (b), the mixture being stirred with a high shear-rate mixer;
(d) the solid material obtained at the end of step (c) is separated off from the liquid medium and calcined in air.

The term "dispersion" used in the present application designates a system in which solid particles are dispersed in a continuous liquid medium. The solid particles generally exhibit a size lower than 500 μm as determined by laser diffraction particle size analyzer (distribution in volume).

The aqueous dispersion S comprises cerium nitrate with a $Ce^{IV}/Ce^{IV}+Ce^{III}$ molar ratio of at least 90.0 mol %. The molar ratio may be between 90.0% and 99.9%, more particularly between 94.0% and 99.9%.

The cerium nitrate used to prepare the aqueous dispersion S may result from the dissolution of a cerium compound, such as cerium hydroxide, with nitric acid. It is advantageous to use a salt of cerium with a purity of at least 99.5%, more particularly of at least 99.9%. The cerium salt solution may be an aqueous ceric nitrate solution. This solution is obtained by reaction of nitric acid with an hydrated ceric oxide prepared conventionally by reaction of a solution of a cerous salt and of an aqueous ammonia solution in the presence of aqueous hydrogen peroxide to convert $Ce^{III}$ cations into $Ce^{IV}$ cations. It is also particularly advantageous to use a ceric nitrate solution obtained according to the method of electrolytic oxidation of a cerous nitrate solution as disclosed in FR 2570087. A solution of ceric nitrate obtained according to the teaching of FR 2570087 may exhibit an acidity of around 0.6 N.

The aqueous dispersion S also comprises dispersed particles of zirconium oxyhydroxide. Zirconium oxyhydroxide may generally be represented by formula $ZrO(OH)_2$. The powder used for the preparation of dispersion S is characterized by an average size d50 is between 5.0 and 100 μm, more particularly between 5.0 μm and 50.0 μm, even more particularly between 25.0 μm and 40.0 μm or between 28.0 and 30.0 μm. d50 corresponds to the median value of a distribution of size of the particles (in volume) obtained with a laser diffraction particle size analyzer, such as HORIBA LA-920. The oxide content expressed as % wt of $ZrO_2$ of the zirconium oxyhydroxide is generally between 35% and 55%. Preferably, the aqueous dispersion S comprises dispersed particles of TZH-40 commercialized by Terio corporation. This product has the following properties: $ZrO_2$+$HfO_2$>40% min, d50=between 27.0 μm and 32.0 μm. More details about this product may be found here: http://www.terio.cn/product/detail/11.

The acidic aqueous dispersion S usually exhibits a total concentration $Ce^{III}+Ce^{IV}$ between 1.0 g/L and 60.0 g/L expressed in terms of cerium oxide. For instance, a concentration of 112.50 g/L of cerium nitrate corresponds to 50.0 g/L of $CeO_2$.

The aqueous dispersion S also comprises lanthanum nitrate and optionally at least one nitrate of a rare earth element (RE) other than cerium and other than lanthanum. The nitrate of the RE may be for example praseodymium nitrate, neodymium nitrate or yttrium nitrate ($Y(NO_3)_3$).

The aqueous dispersion S needs to be acidic. It is characterized by a molar ratio $H^+/Zr$ between 1.0 and 3.5, more particularly between 1.5 and 3.0. The concentration of $H^+$ is generally between 0.05 and 1.40 mol/L, more particularly between 0.30 and 0.80 mol/L. The amount of $H^+$ in the dispersion is controlled by the amount of $H^+$ stemming from the solutions of the raw materials used like cerium nitrate and the amount of $H^+$ added by the controlled addition of nitric acid. The concentration of $H^+$ and hence molar ratio $H^+/Zr$ are determined by mass balance (as e.g. in example 1). The added nitric acid may for instance be a 60 wt % nitric acid solution.

The aqueous dispersion S thus contains dispersed particles of Zr oxyhydroxide, $Ce^{IV}$, optionally $Ce^{III}$, $H^+$, $NO_3^-$, $La^{3+}$ and optionally $RE^{3+}$. It may be obtained by mixing the appropriate quantities of Zr oxyhydroxide and of the nitrate solutions of the elements of the mixed oxide and by adapting the acidity with the controlled addition of $HNO_3$. An example of an aqueous dispersion S is disclosed in example 1.

In step (a), the aqueous dispersion S is heated at a temperature between 100° C. and 180° C., more particularly between 120° C. and 150° C., in order to obtain a dispersion comprising a liquid medium and a precipitate. Either a sealed vessel or an open vessel may be used. Specifically, an autoclave reactor may preferably be used. The duration of the heat treatment is usually between 30 minutes and 10 hours, preferably between 2 hours and 5 hours. The conditions of example 1 (135° C.; 4 h) may be used.

In step (b), a solution of aqueous ammonia is added to the mixture obtained at the end of step (a) until the pH of the mixture is at least 8.0. The pH of the mixture may be between 8.0 and 10.0, more particularly between 8.0 and 9.0. An aqueous solution of ammonia with a concentration between 10 and 14 mol/L may conveniently be used.

Step (c) is performed with the help of a high shear rate mixer. Indeed, in step (c), an organic texturing agent (or "template agent") is added to the mixture obtained at the end of step (b), the mixture being mixed with a high shear-rate mixer.

A skilled person may select a high shear-rate mixer among the ones disclosed in Chapter 8 of Handbook of Industrial Mixing, 2004, Science and Practice, John Wiley & Sons, Inc., ISBN 0-471-26919-0.

Figure 1:
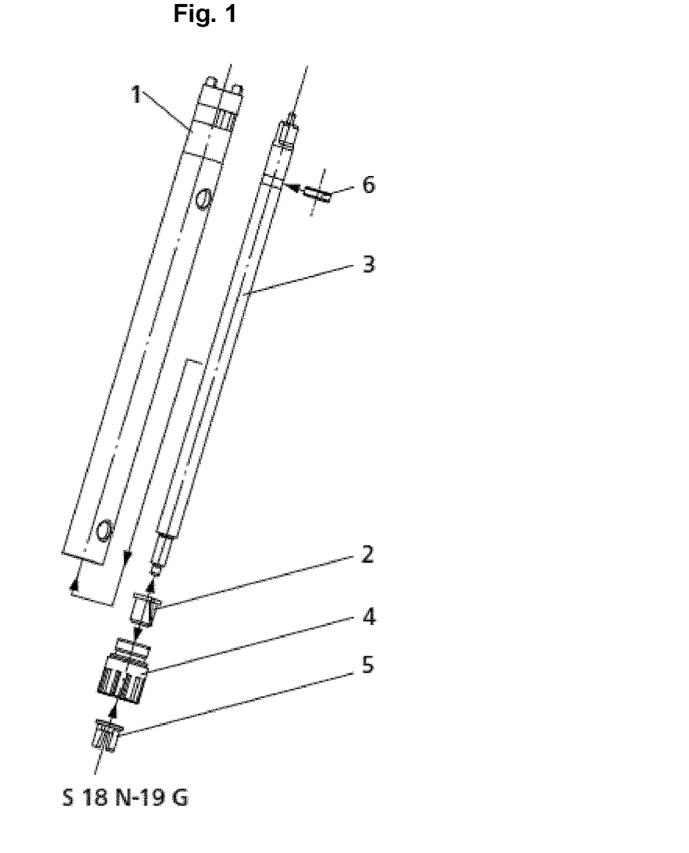
FIG. 1 represents the dispersing element S18N-19G used in example 1 (1. shaft tube; 2. grooved piston ring bearing; 3. shaft; 4. stator; 5. rotor; 6. driveshaft ring).
Figure 2:
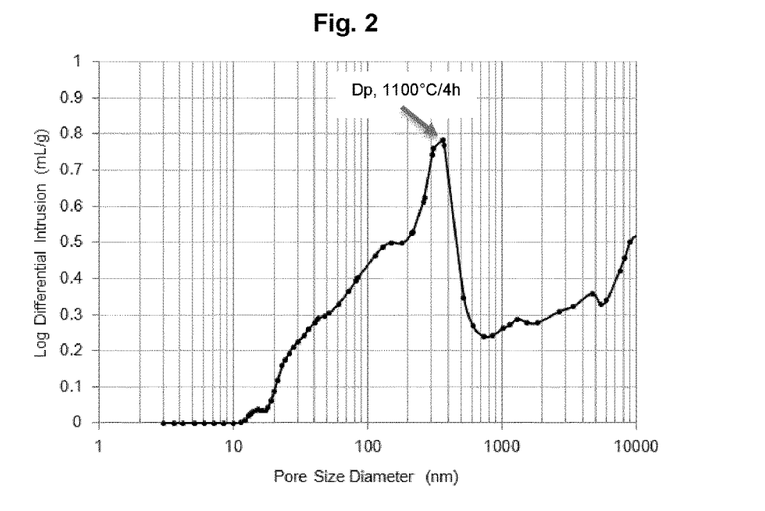

The high-shear mixer may be a rotor-stator high shear mixer. This type of mixer comprises a rotor (or impeller), together with a stationary component known as a stator. The distance between the rotor and the stator is usually low and the speed of the rotor is high, so that when the rotor spins, a high shear and turbulent energy is created in the gap between the rotor and the stator. The fluid in the short distance of the mixer is thus subjected to a high shear rate and to turbulent energy. An example of such high shear mixer may for instance be the ultra-turrax agitator T18 commercialized by IKA equipped with the dispersing element S18N-19G (diameter of the rotor: 12.7 mm; diameter of the rotor: 19 mm; gap between rotor and stator: 0.4 mm). See an example of such dispersing element in FIG. 1.

The high shear-rate mixer may also be a mixer also comprising a rotor and stator and working slightly differently from the previous one. The rotation of the rotor exerts a suction, so that the fluid is drawn upwards into the center of the workhead. Centrifugal forces then drive the fluid towards the periphery of the workhead where it is subjected to a milling action in the gap between the rotor and the stator. The fluid is also subjected to high shear as it is forced out through the perforations that are present in the stator. The fluid is thus expelled from the head and projected radially at high speed. At the same time, some fresh fluid is continually drawn into the workhead. An example of such high shear rate mixer may for instance be the L5M-A or the EX-60, both commercialized by Silverson and both equipped with a square hole high shear Screen™ (stator). This stator is known to provide exceptionally high shear rates that are ideal for the rapid size reduction of soluble and insoluble granular solids. It is also suitable for the preparation of emulsions and fine colloidal suspensions.

The tip speed T of the mixer should preferably be between 5.0 and 25.0 m/s, more particularly between 7.0 and 20.0 m/s. T may be calculated by the following formula: T (m/s)=D$\pi$R/60, where D is the diameter of the rotor (m); and R is the rotational rate of the rotor (rpm).

The tip speed is thus the peripheral velocity of the rotor.

The duration of step (c) may be between 5 min and 120 min, more particularly between 10 and 60 min, even more particularly between 30 and 40 min.

Step (b) may be performed under high shear rate with a high shear rate mixer. The same high shear rate mixer may be used both for optional step (b) and step (c). The same conditions may apply for optional step (b): same high shear rate and/or same speed T and/or same duration. Step (b) may also be performed under low shear rate using a classical mixer (see Example 6).

An organic texturing agent refers to an organic compound, such as a surfactant, able to modify the porous structure of the mixed oxide, notably on pores the size of which is below 500 nm. The organic texturing agent may be added in the form of a solution or a dispersion. The amount of the organic texturing agent, expressed as percentage by weight of additive relative to the weight of the mixed oxide obtained after the calcination step, is generally between 5 and 100% and more particularly between 15 and 60%.

The organic texturing agent (or "template agent") is preferably chosen in the group consisting of: (i) anionic surfactants, (ii) non-ionic surfactants, (iii) polyethylene glycols, (iv) monoacid with an hydrocarbon tail comprising between 7 and 25 carbon atoms, more particularly between 7 and 17, and their salts, and (v) surfactants of the carboxymethylated fatty alcohol ethoxylate type.

As surfactants of anionic type, mention may be made of ethoxycarboxylates, ethoxylated fatty acids, sarcosinates, phosphate esters, sulfates such as alcohol sulfates, alcohol ether sulfates and sulfated alkanolamide ethoxylates, and sulfonates such as sulfo-succinates, and alkylbenzene or alkylnapthalene sulfonates. As non-ionic surfactants, mention may be made of acetylenic surfactants, alcohol ethoxylates, alkanolamides, amine oxides, ethoxylated alkanolamides, long-chain ethoxylated amines, copolymers of ethylene oxide/propylene oxide, sorbitan derivatives, ethylene glycol, propylene glycol, glycerol, polyglyceryl esters and ethoxylated derivatives thereof, alkylamines, alkylimidazolines, ethoxylated oils and alkylphenol ethoxylates. Mention may in particular be made of the products sold under the brands Igepal®, Dowanol®, Rhodamox® and Alkamide®.

The organic texturing acid may also be a mono carboxylic acid with an hydrocarbon tail comprising between 7 and 25 carbon atoms, more particularly between 7 and 17. Mention may be made more particularly of the saturated acids of formula $C_nH_{2n+1}COOH$ with n being an integer between 7 and 25, more particularly between 7 and 17. The following acids may more particularly be used: caproic acid, caprylic acid, capric acid, lauric acid, myristic acid and palmitic acid. Mention may also be more particularly made of lauric acid and ammonium laurate.

Finally, it is also possible to use a surfactant which is selected from those of the carboxymethylated fatty alcohol ethoxylate type. The expression "product of the carboxymethylated fatty alcohol ethoxylate type" is intended to mean products consisting of ethoxylated or propoxylated fatty alcohols comprising a —$CH_2$—COOH group at the end of the chain. These products may correspond to the formula:

$R_1$—O—($CR_2R_3$—$CR_4R_5$—O)$_n$—$CH_2$—COOH in which $R_1$ denotes a saturated or unsaturated carbon-based chain of which the length is generally at most 22 carbon atoms, preferably at least 12 carbon atoms; $R_2$, $R_3$, $R_4$ and $R_5$ may be identical and may represent hydrogen or else $R_2$ may represent an alkyl group such as a $CH_3$ group and $R_3$, $R_4$ and $R_5$ represent hydrogen; n is a non-zero integer that may be up to 50 and more particularly between 5 and 15, these values being included. It will be noted that a surfactant may consist of a mixture of products of the formula above for which $R_1$ may be saturated or unsaturated, respectively, or alternatively products comprising both —$CH_2$—$CH_2$—O— and —$C(CH_3)$=$CH_2$—O— groups.

In step (d), the solid material obtained at the end of step (c) is separated off from the liquid medium and calcined in air. The separation may be performed by conventional means known to the skilled person. A Nutsche filter may conveniently be used.

Before calcination, the solid material may optionally be washed with an aqueous solution, preferably with water at basic pH, for example with an aqueous solution of ammonia (see comparative example 3). Further, the solid material may optionally be dried to a suitable extent before calcination.

The temperature of the calcination may be between 500° C. and 1000° C. The selection of the temperature may be made as desired, depending on the required values of the specific surface area and bulk density. The duration of the calcination may suitably be determined depending on the temperature, and may preferably be between 1 and 20 hours. Calcination may preferably be performed at a temperature comprised between 600° C. and 950° C. The conditions of calcination of example 1 (700° C.; 4 hours) or of example 3 (740° C.; 3 hours) may apply.

Step (d) may be followed by step (e) wherein the calcined product is ground. This makes it possible to obtain a powder with a defined particle size. This step (e) may for instance be performed with a hammer mill. Notwithstanding step (d), d50 is strictly higher than 2.5 μm.

The invention also relates to a mixed oxide obtainable by the process disclosed above.

EXAMPLES

The following examples illustrate the inventions.
Particle Size d50 was determined with a laser particle size analyzer Model LS13320 of Beckman-Coulter. The Fraunhofer mode was used following the guidelines of the constructor. The distribution is obtained from a dispersion of the particles in water in the presence of a dispersant (sodium hexametaphosphate). A relative refractive index of 1.6 was used.
Specific Surface (BET)

The specific surface area was determined automatically on a Macsorb analyzer model I-1220 of Mountech. Prior to any measurement, the samples were carefully degassed to desorb the volatile adsorbed species. To do so, the samples may be heated at 200° C. for 2 hours in a stove, then at 300° C. for 15 min in the cell of the appliance.
Hg Porosimetry The parameters of porosity were determined by mercury intrusion porosimetry. An appliance Autopore IV 9500 of Micromeritics is used following the recommendations of the constructor. The BJH Method with Harkins & Jura isotherms is used.

In the examples 1-9 and in comparative examples 4-6, the source of zirconium was TZH-40, a Zr-based material commercialized by Terio Corporation:
mean particle size d50=28.9 μm or 29.8 μm;
% $ZrO_2$=43.2 wt % or 43.7 wt %.

For the mixed oxide described below, the proportions of the constituting elements are given by weight of oxide relative to the mixed oxide as a whole.

Example 1: Preparation of a Mixed Oxide Based on Cerium Oxide (40%), Zirconium Oxide (50%), Lanthanum Oxide (5%) and Yttrium Oxide (5%)

An aqueous acidic dispersion S was prepared by mixing:
a ceric nitrate solution ([$CeO_2$]=258 g/L; density 1.442 kg/L; $Ce^{IV}/Ce^{IV}+Ce^{III}$ molar ratio of at least 90.0 mol %) corresponding to 20 g of $CeO_2$;
TZH-40 powder (with a mean particle size=28.9 μm, % $ZrO_2$=43.2% in terms of $ZrO_2$), corresponding to 25 g of $ZrO_2$;
a lanthanum nitrate solution ([$La_2O_3$]=388.6 g/L; density 1.612 kg/L) corresponding to 2.5 g of $La_2O_3$;
an yttrium nitrate solution (([$Y_2O_3$]=197.1 g/L; density 1.376 kg/L), corresponding to 2.5 g of $Y_2O_3$;
55.9 g of a 60 wt % nitric acid solution (13.14 mol/L; density 1.38).

The molar ratio $H^+/Zr$ of the dispersion was thus equal to 2.9. This ratio is based on the following calculations:
$H^+$ from cerium nitrate: 0.05 mol (determined by acido-basic titration);
$H^+$ from the 60 wt % nitric acid solution: 0.53 mol;
Zr from zirconium oxyhydroxide: 0.20 mol.

The dispersion was prepared in a reactor equipped with an inclined-blade stirring rotor and was adjusted to a total amount of 1 L with the addition of deionized water. The dispersion S was heated at 135° C., maintained at this temperature for 4 hours, and allowed to cool down to obtain a yellow slurry.

Agitation of the slurry using an homogenizer (ULTRA-TURRAX S18N-19G, IKA) at a tip speed T of 13.3 m/s was started (D=12.7 mm; R=20,000 rpm). During mixing, an aqueous ammonia solution (13.5 mol/L) was introduced to the slurry until a pH=8.3 is obtained, then after 10 minutes, 12.5 g of lauric acid were added, and the high-shear rate mixing was maintained for 30 minutes.

The basic slurry thus obtained was subjected to solid-liquid separation through a Nutsche filter, and washed with aqueous ammonia solution to obtain a filter cake. The cake was calcined in air at 700° C. for 4 hours to obtain the mixed oxide.

Example 2: Preparation of a Mixed Oxide Based on Cerium Oxide (50%), Zirconium Oxide (40%), Lanthanum Oxide (5%) and Yttrium Oxide (5%)

The mixed oxide was prepared in the same way as in Example 1 except that;
the quantity of a $CeO_2$ was 25 g instead of 20 g;
the quantity of $ZrO_2$ was 20 g instead of 25 g;
$H^+$ from cerium nitrate: 0.06 mol;
the quantity of nitric acid at 60 wt % was 37.9 g instead of 55.9 g, so that the dispersion S exhibits a molar ratio $H^+/Zr$=2.6.

Example 3: Preparation of a Mixed Oxide Based on Cerium Oxide (20%), Zirconium Oxide (70%), Lanthanum Oxide (5%) and Yttrium Oxide (5%)

The mixed oxide was prepared in the same way as in Example 1 except that;
the quantity of $CeO_2$ was 10 g instead of 20 g;
the quantity of $ZrO_2$ was 35 g instead of 25 g;
$H^+$ from cerium nitrate: 0.02 mol;
the quantity of 60% nitric acid was 78.2 g instead of 55.9 g (so that the molar ratio $H^+/Zr$ is 2.7).

Example 4: Preparation of a Mixed Oxide Based on Cerium Oxide (65%), Zirconium Oxide (25%), Lanthanum Oxide (5%) and Yttrium Oxide (5%)

The mixed oxide was prepared in the same way as in Example 1 except that;
the quantity of $CeO_2$ was 32.5 g instead of 20 g;
the quantity of $ZrO_2$ was 12.5 g instead of 25 g;
$H^+$ from cerium nitrate: 0.08 mol;
the quantity of 60% nitric acid was 23.9 g instead of 55.9 g so that dispersion S exhibits a molar ratio $H^+/Zr$=3.0.

Example 5: Preparation of a Mixed Oxide Based on Cerium Oxide (40%), Zirconium Oxide (50%), Lanthanum Oxide (5%) and Yttrium Oxide (5%)

The mixed oxide was prepared in the same way as in Example 1 except that the agitation of the slurry after heating at 135° C. was performed using a high shear mixer (L5M-A, Silverson) at a tip speed T of 16.2 m/s.

Example 6: Preparation of a Mixed Oxide Based on Cerium Oxide (40%), Zirconium Oxide (50%), Lanthanum Oxide (5%) and Yttrium Oxide (5%)

The mixed oxide powder was prepared in the same way as in Example 1 except that for step (b), the aqueous ammonia (13.5 mol/L) was introduced to the slurry under agitation using an inclined-blade stirring rotor at an agitation speed of 500 rpm (tip speed T=0.6 m/s). Step (c) was then performed with the homogenizer ULTRA-TURRAX at a tip speed T of 13.3 m/s.

Example 7: Preparation of a Mixed Oxide Based on Cerium Oxide (40%), Zirconium Oxide (50%), Lanthanum Oxide (5%) and Yttrium Oxide (5%)

An aqueous acidic dispersion S was prepared by mixing:
a ceric nitrate solution ([$CeO_2$]=261 g/L; density=1.445 kg/L; $Ce^{IV}/Ce^{IV}+Ce^{III}$ molar ratio of at least 90.0 mol %) corresponding to 4 kg of $CeO_2$;
TZH-40 powder (with a mean particle size=29.8 μm, % $ZrO_2$=43.7% in terms of $ZrO_2$) corresponding to 5.0 kg of $ZrO_2$;
a lanthanum nitrate solution ([$La_2O_3$]=470.0 g/L; density=1.715 kg/L) corresponding to 0.5 kg of $La_2O_3$;
an yttrium nitrate solution ([$Y_2O_3$]=218.2 g/L; density=1.416 kg/L) corresponding to 0.5 kg of $Y_2O_3$;
6.1 kg of a 60 wt % nitric acid solution (13.14 mol/L; density 1.38).

The molar ratio $H^+/Zr$ of the dispersion was 1.7. The dispersion was prepared by mixing in a reactor equipped with an inclined-blade stirring rotor, and adjusted to a total amount of 200 L with deionized water.

The dispersion S was heated to 120° C., maintained at this temperature for 2 hours, and allowed to cool down to obtain a yellow slurry. Agitation of the slurry using a high shear mixer (EX60, Silverson) at a tip speed T of 18.5 m/s was started. During the agitation, aqueous ammonia (13.5 mol/L)

was introduced to the slurry to reach a pH 8.9, then after 5 minutes, 2.5 kg of lauric acid were added, and agitation was maintained for 17 minutes.

The basic slurry thus obtained was subjected to solid-liquid separation through a filter pressing, and washed with aqueous ammonia solution to obtain a filter cake. The cake was calcined at 740° C. for 3 hours and gently milled to obtain the mixed oxide in the powder form.

Example 8: Preparation of a Mixed Oxide Based on Cerium Oxide (40%), Zirconium Oxide (50%), Lanthanum Oxide (5%) and Yttrium Oxide (5%)

The mixed oxide was prepared in the same way as in Example 7 except that:
the quantity of 60% nitric acid was 10.3 kg instead of 6.1 kg so that dispersion S is characterized by a molar ratio $H^+/Zr=2.7$;
the heating temperature was 133° C. instead of 120° C.

Example 9: Preparation of a Mixed Oxide Based on Cerium Oxide (40%), Zirconium Oxide (50%), Lanthanum Oxide (5%) and Yttrium Oxide (5%)

The mixed oxide was prepared in the same way as in Example 8 except that the agitation time after addition of aqueous ammonia and after addition of lauric acid were 10 and 30 minutes, respectively, instead of 5 and 17 minutes.

Comparative Example 1: Preparation of a Mixed Oxide Based on Cerium Oxide (40%), Zirconium Oxide (50%), Lanthanum Oxide (5%) and Yttrium Oxide (5%) Following the Process Disclosed in WO 07131901

A ceric nitrate solution ($[CeO_2]=259$ g/L; density=1.439 kg/L, with a $Ce^{IV}/Ce^{IV}+Ce^{III}$ molar ratio of at least 90.0%) corresponding to 6.0 kg of $CeO_2$, a zirconyl nitrate solution ($[ZrO_2]=266$ g/L; density=1.408 kg/L) corresponding to 7.5 kg of $ZrO_2$, a lanthanum nitrate solution ($[La_2O_3]=472.5$ g/L; density=1.711 kg/L) corresponding to 0.75 kg of $La_2O_3$ and an yttrium nitrate solution ($[Y_2O_3]=208.5$ g/L; density=1.391 kg/L) corresponding to 0.75 kg of $Y_2O_3$ were mixed in a tank equipped with an inclined-blade stirring rotor, and adjusted to a total amount of 125 L with deionized water, then agitated to prepare a homogeneous co-nitrate solution.

A solution of aqueous ammonia (40 L, 12 mol/L) was introduced into a reactor equipped with an inclined-blade stirring rotor and the volume was then made up with distilled water so as to obtain a total volume of 125 L and a stoichiometric excess of aqueous ammonia of 40% relative to the cations to be precipitated.

The co-nitrate solution previously prepared was introduced into the reactor under agitation at a speed of 90 rpm (tip speed T=1.8 m/s) in 1 hour.

The obtained slurry was heated to 135° C., maintained this temperature for 4 hours, and allowed to cool down. 5.0 kg of lauric acid were added into the dispersion thus obtained and the dispersion was kept agitation for 1 hour. The dispersion was subjected to solid-liquid separation through a filter pressing, and washed with aqueous ammonia solution to obtain a filter cake. The cake was calcined at 750° C. for 3 hours to obtain a composite oxide powder.

Comparative Example 2: Preparation of a Mixed Oxide Based on Cerium Oxide (40%), Zirconium Oxide (50%), Lanthanum Oxide (5%) and Yttrium Oxide (5%) Following the Process Disclosed in WO 2011/138255

Two solutions of nitrates were prepared beforehand, one consisting of cerium nitrate and zirconium nitrate, and the other of lanthanum nitrate and yttrium nitrate. A ceric nitrate solution ($[CeO_2]=259$ g/L; density=1.439 kg/L, with a $Ce^{IV}/Ce^{IV}+Ce^{III}$ molar ratio of at least 90.0%) corresponding to 6.0 kg of $CeO_2$ and a zirconyl nitrate solution ($[ZrO_2]=266$ g/L; density=1.408 kg/L) corresponding to 7.5 kg of $ZrO_2$ were mixed in a first tank equipped with an inclined-blade stirring rotor, and adjusted to a total amount of 106 L with deionized water, then agitated to prepare a homogeneous CeZr co-nitrate solution.

A lanthanum nitrate solution ($[La_2O_3]=472.5$ g/L; density=1.711 kg/L) corresponding to 0.75 kg of $La_2O_3$ and an yttrium nitrate solution ($[Y_2O_3]=208.5$ g/L; density=1.391 kg/L) corresponding to 0.75 kg of $Y_2O_3$ were mixed in a second tank equipped with an inclined-blade stirring rotor, and adjusted to a total amount of 19 L with deionized water, then agitated to prepare a homogeneous LaY co-nitrate solution.

A solution of aqueous ammonia (40 L, 12 mol/L) was introduced into a reactor equipped with an inclined-blade stirring rotor and the volume was then made up with distilled water so as to obtain a total volume of 125 L and a stoichiometric excess of aqueous ammonia of 40% relative to the cations to be precipitated.

The first CeZr co-nitrate solution was introduced into the reactor under agitation at a speed of 115 rpm in 50 minutes. After 10 minutes, the second LaY co-nitrate solution was introduced into the reactor under agitation at a speed of 85 rpm in 10 minutes. Heating, introduction of lauric acid, solid-liquid separation, washing and calcination were performed following the same procedure as Comparative example 1 except that the calcination temperature was 840° C.

Comparative Example 3: Preparation of a Mixed Oxide Based on Cerium Oxide (30%), Zirconium Oxide (60%), Lanthanum Oxide (5%) and Yttrium Oxide (5%) Following the Process Disclosed in WO 2017/187085

A precursor solution was prepared introducing 8.5 L of a zirconyl nitrate solution ($[ZrO_2]=266$ g/L; density=1.408 kg/L) and 7.0 L of a ceric nitrate solution ($[CeO_2]=259$ g/L; density=1.439 kg/L) in a tank containing 95.4 L of deionized water. An aqueous solution of lanthanum nitrate and yttrium nitrate was also prepared with 10.8 L of water, 0.53 L of lanthanum nitrate solution ($[La_2O_3]=472.5$ g/L; density=1.711 kg/L) and 1.2 L of yttrium nitrate solution ($[Y_2O_3]=208.5$ g/L; density=1.391 kg/L).

In a large reactor of 250 L equipped with a mixing device, an ammonia solution (12 L, 12 mol/L) and deionized water are introduced so as to obtain a total volume of 125 L of basic solution.

The cerium and zirconium nitrate solution is then introduced in the stirred reactor containing the ammonia solution over a period of 45 min under a mixing speed of 200 rpm. The lanthanum and yttrium nitrate solution is then introduced over a period of 15 min in the stirred reactor under a mixing speed of 25 rpm.

The obtained dispersion is poured in a stirred autoclave and the dispersion is heated up to 150° C. for 2 h. After cooling down to a temperature below 60° C., 1.65 kg of lauric acid is added. The dispersion is maintained under stirring for 1 h, and is then filtered and washed with ammonia water (pH 9.5; 250 L). The obtained cake is then calcined in air at 825° C. for 3 h.

Comparative Example 4: Preparation of a Mixed Oxide Based on Cerium Oxide (40%), Zirconium Oxide (50%), Lanthanum Oxide (5%) and Yttrium Oxide (5%)

The mixed oxide was prepared in the same way as in Example 1 except that the 60% nitric acid was not added, so that the aqueous acidic dispersion S exhibits a molar ratio $H^+/Zr=0.23$ ($H^+$ from cerium nitrate: 0.047 mol; Zr from zirconium oxyhydroxide: 0.203 mol). As can be seen, $D_{p,\ 1100°\ C./4\ h}$ is only 56 nm.

Comparative Example 5: Preparation of a Mixed Oxide Based on Cerium Oxide (40%), Zirconium Oxide (50%), Lanthanum Oxide (5%) and Yttrium Oxide (5%)

The mixed oxide was prepared in the same way as in Example 1 except that 83.0 g of 60% nitric acid were added, so that the aqueous acidic dispersion S exhibits a molar ratio $H^+/Zr=4.1$. As can be seen, $D_{p,\ 1100°\ C./4\ h}$ is only 20 nm.

Comparative Example 6: Preparation of a Mixed Oxide Based on Cerium Oxide (40%), Zirconium Oxide (50%), Lanthanum Oxide (5%) and Yttrium Oxide (5%)

This mixed oxide was prepared in the same way as in Example 7 except that the agitation of the slurry was carried out using an inclined-blade stirring rotor at an agitation speed of 92 rpm (tip speed T=2.4 m/s) instead of a high shear rate mixer. As can be seen, $D_{p,\ 1100°\ C./4\ h}$ is only 28 nm.

The invention claimed is:

1. A mixed oxide comprising zirconium, cerium, lanthanum and optionally at least one rare-earth element other than cerium and other than lanthanum (RE) with the following composition:
   between 18.0% and 70.0% by weight of cerium;
   between 1.0% and 10.0% by weight of lanthanum;
   up to 10.0% by weight of the at least one rare earth element(s) (RE(s)) other than cerium and other than lanthanum;
   the remainder as zirconium;
   the mixed oxide being in the form of particles exhibiting a d50 strictly higher than 2.5 μm and the proportions of the elements (Ce, La, RE, Zr) being given by weight of oxide relative to the mixed oxide as a whole, characterized in that:
   it exhibits a specific surface area (BET) of at least 28 m²/g after calcination in air at 1100° C. for 4 hours;
   the peak with the highest intensity in the domain of the pores with a pore size lower than 500 nm, is between 70 nm, this value being excluded, and 500 nm, and corresponds to a pore size $D_{p,1100°\ C./4\ h}$; and
   the peak with the highest intensity in the domain of the pores with a pore size lower than 500 nm is between 35 nm and 75 nm, and corresponds to a pore size $D_{p,900°\ C./4\ h}$, and
   it exhibits a total pore volume $V_{500\ nm,1100°\ C./4\ h}$ for the pores with a size lower than 500 nm, of at least 0.30 ml/g; wherein
   the pore size $D_{p,1100°\ C./4\ h}$ and the total pore volume $V_{500\ nm,1100°\ C./4\ h}$ being determined by mercury porosimetry on the mixed oxide after calcination in air at 1100° C. for 4 hours and $D_{p,900°\ C./4\ h}$, is determined by mercury porosimetry on a mixed oxide after calcination in air at 900° C. for 4 hours.

2. The mixed oxide according to claim 1, further comprising hafnium and wherein the proportion of hafnium is lower or equal to 2.5%, this proportion being given by weight of oxide relative to the mixed oxide as a whole.

TABLE I

| | mixed oxide | | | | conditions of process | | | specific surface areas (BET) (m²/g) | | | | $V_{500\ nm,}$ | | total pore |
|---|---|---|---|---|---|---|---|---|---|---|---|---|---|---|
| | | | | | | | calc. | | 900° C./ | 1000° C./ | 1100° C./ | $D_{p,\ 1100°\ C./\ 1100°\ C./4\ h}$ | | volume* |
| Ex. | Ce | Zr | La | Y | $H^+/Zr$ | mixer | (° C./hrs) | as is | 4 h | 4 h | 4 h | $_{4\ h}$ (nm) | (mL/g) | α | (mL/g) |
| 1 | 40 | 50 | 5 | 5 | 2.9 | M1 | 700/4 | 79 | 68 | 53 | 31 | 218 | 0.68 | 0.24 | 1.40 |
| 2 | 50 | 40 | 5 | 5 | 2.6 | M1 | 700/4 | 86 | 72 | 55 | 32 | 129 | 0.57 | 0.30 | 1.06 |
| 3 | 20 | 70 | 5 | 5 | 2.7 | M1 | 700/4 | 82 | 64 | 54 | 31 | 72 | 0.33 | 0.73 | 0.67 |
| 4 | 65 | 25 | 5 | 5 | 3.0 | M1 | 700/4 | 87 | 68 | 50 | 30 | 134 | 0.50 | 0.32 | 1.08 |
| 5 | 40 | 50 | 5 | 5 | 2.9 | M2 | 700/4 | 87 | 75 | 57 | 28 | 153 | 0.57 | 0.26 | 1.00 |
| 6 | 40 | 50 | 5 | 5 | 2.9 | M1 | 700/4 | 87 | 69 | 54 | 30 | 113 | 0.44 | 0.43 | 0.95 |
| 7 | 40 | 50 | 5 | 5 | 1.7 | M2 | 740/3 | 99 | 79 | 59 | 29 | 363 | 0.60 | 0.25 | 1.63 |
| 8 | 40 | 50 | 5 | 5 | 2.7 | M2 | 740/3 | 94 | 74 | 57 | 30 | 129 | 0.61 | 0.25 | 1.78 |
| 9 | 40 | 50 | 5 | 5 | 2.7 | M2 | 740/3 | 93 | 74 | 57 | 29 | 302 | 0.62 | 0.23 | 1.88 |
| C1 | 40 | 50 | 5 | 5 | 0.2 | M0 | 750/3 | 91 | 75 | 53 | 27 | 40 | 0.27 | 0.70 | 0.75 |
| C2 | 40 | 50 | 5 | 5 | 0.2 | M0 | 840/3 | 76 | 74 | 58 | 31 | 52 | 0.43 | 0.58 | 1.40 |
| C3 | 40 | 50 | 5 | 5 | 0.2 | M0 | 825/3 | 87 | 83 | 61 | 31 | 28 | 0.20 | — | 0.54 |
| C4 | 40 | 50 | 5 | 5 | 0.23 | M1 | 700/4 | 106 | 72 | 53 | 28 | 56 | 0.35 | 0.63 | 0.71 |
| C5 | 40 | 50 | 5 | 5 | 4.1 | M1 | 700/4 | 75 | 58 | 44 | 24 | 20 | 0.33 | 0.36 | 0.89 |
| C6 | 40 | 50 | 5 | 5 | 1.7 | M0 | 740/3 | 90 | 72 | 56 | 29 | 28 | 0.23 | 0.78 | 0.58 | all compositions given by weight % equiv. oxide
*obtained after calcination in air at 1100° C. for 4 hours and read on the cumulative porosity curve
M0: standard mixer (impeller)/
M1: mixer homogenizer ultra-turrax/
M2: Silverson L5M-A or EX60 all mixed oxides exhibit a d50 > 2.5 μm (strictly higher than 2.5 μm)

3. The mixed oxide according to claim 1, consisting of a combination of the oxides of zirconium, of cerium, of lanthanum, optionally of at least one rare earth element other than cerium and other than lanthanum and optionally of hafnium, with the following composition:
between 18.0% and 70.0% by weight of cerium;
between 1.0% and 10.0% by weight of lanthanum;
up to 10.0% by weight of the rare earth element(s) (RE(s)) other than cerium and other than lanthanum;
a proportion of hafnium lower or equal to 2.0%;
the remainder as zirconium;
the mixed oxide being in the form of particles exhibiting a d50 strictly higher than
2.5 μm and the proportions of the elements (Ce, La, RE, Hf, Zr) being given by weight of oxide relative to the mixed oxide as a whole, characterized in that:
it exhibits a specific surface area (BET) of at least 28 m$^2$/g after calcination in air at 1100° C. for 4 hours;
the peak with the highest intensity in the domain of the pores with a size lower than 500 nm corresponds to a pore size $D_{p,1100°\ C./4\ h}$ between 70 nm, this value being excluded, and 500 nm; and
the peak with the highest intensity in the domain of the pores with a pore size lower than 500 nm is between 35 nm and 75 nm, and corresponds to a pore size $D_{p,900°\ C./4\ h}$, and
it exhibits a total pore volume $V_{500\ nm,1100°\ C./4\ h}$ for the pores with a size lower than 500 nm, of at least 0.30 ml/g;
wherein
the pore size $D_{p,\ 1100°\ C./4\ h}$ and the total pore volume $V_{500\ nm,1100°\ C./4\ h}$ being determined by mercury porosimetry on the mixed oxide after calcination in air at 1100° C. for 4 hours and $D_{p,900°\ C./4\ h}$, is determined by mercury porosimetry on a mixed oxide after calcination in air at 900° C. for 4 hours.

4. The mixed oxide according to claim 1, wherein the proportion of cerium is:
between 25.0% and 65.0% (this value being excluded).

5. The mixed oxide according to claim 1, wherein the proportion of cerium is:
between 35.0% and 55.0%.

6. The mixed oxide according to claim 1, wherein the proportion of lanthanum is between 3.0% and 10.0%.

7. The mixed oxide according to claim 1, wherein the mixed oxide is a mixed oxide of zirconium, of cerium, of lanthanum and of at least one rare-earth element (RE) other than cerium and other than lanthanum and the total proportion of the rare-earth element(s) other than cerium and other than lanthanum is up to 10.0%.

8. The mixed oxide according to claim 1, wherein the proportion of zirconium is at least 20.0%.

9. The mixed oxide according to claim 1, wherein the proportion of zirconium is at most 79.0%.

10. The mixed oxide according to claim 1, wherein the mixed oxide exhibits a specific surface area (BET) of at least 50 m$^2$/g after calcination in air at 1000° C. for 4 hours.

11. The mixed oxide according to claim 1, wherein the mixed oxide exhibits a specific surface area (BET) of at least 60 m$^2$/g after calcination in air at 900° C. for 4 hours.

12. The mixed oxide according to claim 1, wherein after calcination in air at 1100° C. for 4 hours, it exhibits a total pore volume $V_{500\ nm,1100°\ C./4\ h}$ for the pores with a size lower than 500 nm, between 0.30 and 0.70 ml/g.

13. The mixed oxide according to claim 1, wherein after calcination in air at 1100° C. for 4 hours, the mixed oxide exhibits a total pore volume of at least 0.60 ml/g.

14. The mixed oxide according to claim 1, characterized by a specific surface area (BET) after calcination in air at 1100° C. for 4 hours between 28 and 40 m$^2$/g.

15. The mixed oxide according to claim 1, characterized by a specific surface area (BET) after calcination in air at 1000° C. for 4 hours between 50 and 70 m$^2$/g.

16. The mixed oxide according to claim 1, characterized by a specific surface area (BET) after calcination in air at 900° C. for 4 hours between 60 and 90 m$^2$/g.

17. The mixed oxide according to claim 1, characterized by:
a specific surface area (BET) of at least 30 m$^2$/g after calcination in air at 1100° C. for 4 hours;
a peak with the highest intensity in the domain of the pores with a size lower than 500 nm which corresponds to a pore size $D_{p,1100°\ C./4\ h}$ between 100 and 400 nm;
a total pore volume $V_{500\ nm,1100°\ C./4\ h}$ for the pores with a size lower than 500 nm, of at least 0.50 ml/g;
a total pore volume of at least 1.00 ml/g after calcination in air at 1100° C. for 4 hours.

18. The mixed oxide according to claim 1, characterized by a ratio α lower than 0.35, α being defined by the following formula:

$$\alpha = V_{70\ nm,1100°\ C./4\ h} / V_{500\ nm,1100°\ C./4\ h}$$

wherein $V_{70\ nm,\ 1100°\ C./4\ h}$ is the total pore volume for the pores with a size lower than 70 nm, after calcination in air at 1100° C. for 4 hours.

19. A process of preparation of a mixed oxide according to claim 1, the process comprising the following steps:
(a) heating an aqueous acidic dispersion S is heated at a temperature between 100° C. and 180° C. in order to obtain a dispersion comprising a liquid medium and a precipitate, wherein the dispersion S comprises:
(i) cerium nitrate with a $Ce^{IV}/Ce^{IV}+Ce^{III}$ molar ratio of at least 90.0 mol %;
(ii) lanthanum nitrate;
(iii) optionally at least one nitrate of a rare earth element (RE) other than cerium and other than lanthanum; and
(iv) particles of zirconium oxyhydroxide wherein the powder of zirconium oxyhydroxide used for the preparation of the dispersion exhibits an average size d50 between 5.0 μm and 100.0 μm, d50 corresponding to the median value of a distribution of size of the particles (in volume) obtained with a laser diffraction particle size analyzer;
the dispersion S being characterized by a molar ratio H+/Zr between 1.0 and 3.5;
(b) adding an ammonia solution to the mixture obtained at the end of step (a) until the pH of the mixture is at least 8.0;
(c) then adding an organic texturing agent to the mixture obtained at the end of step (b), the mixture being stirred with a high shear-rate mixer;
(d) separating the solid material obtained at the end of step (c) from the liquid medium and calcining the solid material in air to obtain the mixed oxide.

20. The process according to claim 19, wherein the concentration of H$^+$ in the acidic dispersion S is between 0.05 and 1.40 mol/L.

21. The process according to claim 19, wherein the organic texturing agent is lauric acid or a salt of lauric acid.

22. The process according to claim 19, wherein the tip speed T of the high shear rate mixer is between 5.0 and 25.0 m/s, T being calculated by the following formula: T (m/s)=DπR/60, where D is the diameter of the rotor (m) and R is the rotational rate of the rotor (rpm).

23. A catalytic composition comprising:
(i) at least one mineral material;
(ii) at least one dispersed platinum group metal; and
(iii) the mixed oxide according to claim 1.

24. A catalytic converter comprising a porous support and the nixed oxide of the catalytic composition of claim 23 on the surface of the support.

\* \* \* \* \*